UNITED STATES PATENT OFFICE.

MOSES S. HIGBIE, OF SOUTH AMBOY, NEW JERSEY, ASSIGNOR OF ONE-HALF TO GEORGE G. FRELINGHUYSEN, OF NEW YORK, N. Y.

PROCESS OF MANUFACTURING EARTHENWARE.

SPECIFICATION forming part of Letters Patent No. 373,290, dated November 15, 1887.

Application filed March 8, 1887. Serial No. 230,115. (No specimens.)

*To all whom it may concern:*

Be it known that I, MOSES S. HIGBIE, of South Amboy, New Jersey, have invented a new and Improved Process for the Manufacture of Earthenware and the Compound Therefrom, of which the following is such a full, clear, and exact description as will enable others skilled in the art to make and use the same.

This my invention relates to the manufacture of compounds of earthenware which are impervious to air and water; and it consists of a mixture of pulverized calcined clay with hot asphaltum or its equivalent and the process of manufacturing the same. Clay in its ordinary form contains a large percentage of combined water, and is consequently very greatly expanded and contracted by heat and cold, to overcome which I subject the clay to an intense heat for time sufficient to drive out the combined water, sulphur, acids, and other volatile impurities. The clay for this purpose is baked in the ordinary brick-burning ovens, being formed into slabs or other shapes, so as to be readily affected by the heat and thoroughly baked. It is then removed, broken, and pulverized into a fine pulverulent mass or powder. The clay thus treated is made hot and mixed with hot and melted asphaltum, tar, wax, paraffine, or other like binding agent, with which it makes a mortar or plastic compound. I have found the paraffine-wax from oil-refineries especially adapted for this purpose. The proportion is from sixty to eighty parts of clay to forty to twenty parts of binding material, depending on the purpose for which the compound is to be used and the quality of the binding material. The compound thus made while still hot is soft and plastic and may be pressed into any desired form—as brick, blocks, drain-pipe, or the like— and when cool will be a hard, air and water resisting material, somewhat elastic and not to be melted again at any ordinary temperature. The material will neither expand nor contract from heat or cold.

The material while still hot may be fed through a macaroni-machine and made into pipe, or it may be fed through with a rod or wire and make a covering or coating thereon.

To give greater softness and pliability to the material, glycerine may be substituted for part of the binding agent up to one-half thereof.

I am aware that asphaltum, paraffine, and like substances have heretofore been mixed with sand and other material which is expanded by heat, and do not claim the same; but What I do claim, and desire to secure by Letters Patent, is—

1. The process herein described, consisting of calcining clay, pulverizing the same, heating it, and mixing while still hot with hot paraffine-wax or its equivalent.

2. The compound herein described, consisting of calcined and pulverized clay with paraffine-wax, as specified and set forth.

MOSES S. HIGBIE.

Witnesses:
JOSEPH J. SULLIVAN,
G. G. FRELINGHUYSEN.